(12) United States Patent
Mozurkewich et al.

(10) Patent No.: US 10,562,458 B2
(45) Date of Patent: Feb. 18, 2020

(54) REMOVABLE FRESH WATER RESERVOIR (71) Applicant: FORD GLOBAL TECHNOLOGIES, LLC, Dearborn, MI (US)

(72) Inventors: Kevin Mozurkewich, Livonia, MI (US); Daniel Ferretti, Commerce Township, MI (US); Marcos Silva Kondrad, Macomb Township, MI (US); Kevin Wayne Preuss, Berkley, MI (US); Johnathan Andrew Line, Northville, MI (US); Keith Allen Godin, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/588,835

(22) Filed: May 8, 2017

(65) Prior Publication Data
US 2018/0319347 A1 Nov. 8, 2018

(51) Int. Cl.
*B60R 7/04* (2006.01)
*B60N 3/10* (2006.01)
(Continued)

(52) U.S. Cl.
CPC ............ *B60R 7/043* (2013.01); *B60N 2/3009* (2013.01); *B60N 2/3045* (2013.01); *B60N 3/10* (2013.01); *B60N 3/18* (2013.01)

(58) Field of Classification Search
CPC ...... B60N 3/18; B60N 2/3045; B60N 2/3009; B60N 3/10; B60R 7/043; B05B 9/0805;
(Continued)

(56) References Cited

U.S. PATENT DOCUMENTS 3,498,076 A * 3/1970 Michael ............... B60H 1/3235
62/244
3,710,819 A * 1/1973 Williamson ........ A47L 15/4217
137/355.17
(Continued)

FOREIGN PATENT DOCUMENTS

EP 2 769 904 8/2014
FR 2917686 A1 * 12/2008 ............... B60N 2/64

OTHER PUBLICATIONS

Machine translation of foreign reference FR 2917686 obtained from http://translationportal.epo.org/emtp/translate/?ACTION=description-retrieval&COUNTRY=FR&ENGINE=google&FORMAT=docdb&KIND=A1&LOCALE=en_EP&NUMBER=2917686&OPS=ops.epo.org/3.2&SRCLANG=fr&TRGLANG=en (last accessed on Jun. 7, 2018) (Year: 2018).*

(Continued)

*Primary Examiner* — Theodore V Adamos
(74) *Attorney, Agent, or Firm* — Vichit Chea; Price Heneveld LLP (57) ABSTRACT

A water reservoir in combination with a seating assembly for a motor vehicle comprising a lower seat assembly having a deployed position and a seatback assembly having a deployed position is disclosed, where the water reservoir is installed either behind the seatback assembly in the deployed position or below the lower seat assembly in the deployed position, and the water reservoir is removably received within a volume defined in part by either of the seatback assembly or the lower seat assembly, respectively.

19 Claims, 7 Drawing Sheets

(51) Int. Cl.
*B60N 3/18* (2006.01)
*B60N 2/30* (2006.01)

(58) Field of Classification Search
CPC ....... B05B 9/04; B05B 9/0894; B05B 9/0883; B05B 9/0811; B05B 9/01
USPC .................. 239/195, 172, 332, 375, 146
See application file for complete search history.

(56) References Cited

U.S. PATENT DOCUMENTS

| | | | | |
|---|---|---|---|---|
| 5,447,110 A * | 9/1995 | Brown | ............... | B60R 11/06 141/114 |
| 5,848,443 A * | 12/1998 | Waugh | ............... | B60R 15/04 4/458 |
| 6,047,848 A * | 4/2000 | Davis | ............... | B65D 1/0292 215/382 |
| 6,513,686 B1 * | 2/2003 | Ben-Sasson | ............ | B60N 3/18 224/275 |
| 6,675,998 B2 * | 1/2004 | Forsman | ............... | A45F 3/20 215/306 |
| 6,824,029 B2 * | 11/2004 | Tuel, Jr. | ............... | F41C 33/06 220/532 |
| 6,945,438 B1 * | 9/2005 | Shih | ............... | A01M 7/0035 222/186 |
| 7,118,050 B1 * | 10/2006 | Chen | ............... | B05B 9/0861 239/328 |
| 7,234,653 B2 * | 6/2007 | Powell | ............... | B05B 9/0423 137/312 |
| 7,328,818 B2 | 2/2008 | Prabucki | | |
| 9,016,749 B2 * | 4/2015 | Mueller | ............... | B60R 5/006 296/37.14 |
| 2006/0170236 A1 * | 8/2006 | Porter, II | ............... | B60R 5/04 296/37.16 |
| 2007/0119866 A1 * | 5/2007 | Sheppard | ............... | A42B 3/048 222/175 |
| 2007/0170281 A1 | 7/2007 | Cooper et al. | | |
| 2008/0110931 A1 | 5/2008 | Prabucki | | |
| 2009/0039128 A1 * | 2/2009 | Damico | ............... | B60R 7/043 224/572 |
| 2013/0153055 A1 | 6/2013 | Gaffoglio | | |
| 2013/0154332 A1 * | 6/2013 | Lindsay | ............... | B60N 2/3031 297/396 |
| 2016/0193949 A1 * | 7/2016 | Pywell | ............... | B60R 7/043 297/188.1 |
| 2016/0200258 A1 * | 7/2016 | Chawlk | ............... | B60R 7/043 296/37.14 |

OTHER PUBLICATIONS

Du-Ha, Storage Solutions for Pickup Trucks, obtained from https://web.archive.org/web/20101205100234/http://du-ha.com/ (Dec. 5, 2010) (Year: 2010).*

* cited by examiner

REMOVABLE FRESH WATER RESERVOIR

FIELD OF THE INVENTION

The present invention generally relates to a device to provide an on-board fresh water reservoir for a motor vehicle and, more particularly, a removable fresh water reservoir single-piece storage bin disposed behind or below a flip upward second row motor vehicle seating assembly.

BACKGROUND OF THE INVENTION

Motor vehicle seating assemblies, particularly light and medium duty trucks having a second row seating position, are often equipped with flip upward or so-called "stadium style" lower seat assemblies. Such lower seat assemblies have a design or deployed position, in which the lower seat assembly is in a deployed condition so as to support the motor vehicle occupant, and a stowed position, in which the lower seat assembly is pivoted upwardly against the seatback about a rear portion of the lower seat assembly. When the lower seat assembly is in the stowed position, the floor pan of the motor vehicle forward of the motor vehicle seating assembly is exposed and available for storage and the like.

Additionally, the seatback assembly of the second row seating position may be pivoted between a deployed position, in which the seatback assembly is in an upright deployed condition so as to support the motor vehicle occupant, and a stowed position, in which the seatback assembly is pivoted forward to rest upon the lower seat assembly about a lower edge of the seatback. When the seatback assembly is in the stowed position, a raised cargo area may be defined above the seatback assembly and by a rearward facing surface of the seatback assembly. When each of the lower seat assembly and the seatback assembly is in its deployed position, a volume of usable space is often created behind the seatback assembly and below the lower seat assembly, respectively.

Users of such light and medium duty trucks may also experience a need to have access to fresh potable water. For example, many light and medium duty trucks users use such motor vehicles for work, off-road expeditions, outdoor activities, and rugged adventures. With these activities come mud, dirt, and grime that the users do not want contaminating the interior of their vehicle. However, these activities also are often conducted in remote locations where fresh potable water is unavailable. Thus, a second row motor vehicle seating assembly that utilizes the usable space behind or below the motor vehicle seating assembly with a mobile source of fresh water that can go anywhere with the motor vehicle is desired.

SUMMARY OF THE INVENTION

According to one aspect of the present disclosure, a water reservoir is combined with a seating assembly for a motor vehicle comprising a lower seat assembly having a deployed position, a seatback assembly having a deployed position, and the water reservoir installed either behind the seatback assembly in the deployed position or below the lower seat assembly in the deployed position, wherein the water reservoir is removably received within a volume defined in part by either of the seatback assembly or the lower seat assembly in the deployed position, respectively.

Embodiments of the first aspect of the disclosure can include any one or a combination of the following features:

A water reservoir having a primary chamber within which water may be stored, the primary chamber further comprising a water inlet disposed within an upper portion thereof and a water outlet within a lower portion thereof, and a secondary chamber within which a flexible retractable hose in fluid communication with the water outlet of the primary chamber may be retractably disposed;

a water reservoir comprising blow molded polyurethane;

a water reservoir having a depression formed within an upper portion and a countersunk handle disposed within the depression;

a water reservoir evacuated via gravity;

a water reservoir evacuated via pressurization of the primary chamber of the water reservoir;

a water reservoir forming a collapsible container when empty;

each of the lower seat assembly and the seatback assembly being segregated into two separate seating assemblies in side by side juxtaposition one to the other and the volume is defined in part by either of the seatback assembly or the lower seat assembly, respectively, of a one of the two separate seating assemblies;

a first side of each of the lower seat assembly and seatback assembly comprises approximately 40% of the width of the motor vehicle seating assembly and a second side of each of the lower seat assembly and seatback assembly comprises approximately 60% of the width of the motor vehicle seating assembly;

a pair of water reservoirs in side by side juxtaposition one to the other, one each of the pair of water reservoirs being disposed within the volume defined in part by one of the seatback or the lower seat assembly, respectively, of a one of the two separate motor vehicle seating assemblies;

a lower seat assembly comprising a flip upward lower seat assembly having the deployed position and a stowed position, wherein the lower seat assembly may be pivoted between the deployed position, in which the lower seat assembly is in a deployed horizontal condition so as to support a motor vehicle occupant, and the stowed position, in which the lower seat assembly is pivoted upwardly against the seatback about a rear portion of the lower seat assembly and, when the lower seat assembly is in the deployed position, a volume is defined between a lower surface of the lower seat assembly and an upper surface of a floor pan, and the water reservoir is removably received within the volume defined between the lower surface of the lower seat assembly and the upper surface of a floor pan;

a volume further defined by an enclosure created by risers disposed below the lower seat assembly;

a water reservoir comprising a primary chamber within which water may be stored, the primary chamber further comprising a water inlet disposed within an upper portion thereof and a water outlet within a lower portion thereof, and a storage chamber within which a flexible retractable hose in fluid communication with the water outlet of the primary chamber may be retractably disposed, and the seating assembly further comprises an outboard side having a removable cover by which the flexible retractable hose in fluid communication with the water outlet of the primary chamber may be extended externally from the motor vehicle;

the risers receive a pair of water reservoirs in side in side to side juxtaposition one to the other;

a seatback assembly comprising a pivotable cushion having the deployed position and a stowed position, wherein the seatback assembly may be pivoted between the deployed position, in which the seatback assembly is in an upright deployed condition so as to support a motor vehicle occupant, and the stowed position, in which the seatback assembly is pivoted forward to rest upon the lower seat assembly about a lower edge of the seatback assembly and, when the seatback assembly is in the deployed position, a volume is defined between a rear surface of the seatback assembly and a forward surface of a rear bulkhead of the motor vehicle, and the water reservoir is removably received within the volume defined between the rear surface of the seatback assembly and the forward surface of a rear bulkhead of the motor vehicle;

retaining straps removably affixing the water reservoir against the forward surface of the rear bulkhead of the motor vehicle; and an outboard side having a removable cover by which a flexible retractable hose in fluid communication with a water outlet of a primary chamber of the water reservoir may be retracted through an opening and out of the motor vehicle.

According to another aspect of the present disclosure, a water reservoir is combined with a second row seating position motor vehicle seating assembly comprising a seatback assembly having a deployed position and a flip upward lower seat assembly having a deployed position and a stowed position, wherein the lower seat assembly may be pivoted between the deployed position, in which the lower seat assembly is in a deployed horizontal condition so as to support a motor vehicle occupant, and the stowed position, in which the lower seat assembly is pivoted upwardly against the seatback about a rear portion of the lower seat assembly and, when the lower seat assembly is in the deployed position, a volume is defined between a lower surface of the lower seat assembly and an upper surface of a floor pan. A water reservoir may be installed below the lower seat assembly in the deployed position, wherein the water reservoir is removably received within the volume defined between the lower surface of the lower seat assembly and the upper surface of a floor pan.

According to a further aspect of the present disclosure, comprises second row seating position motor vehicle seating assembly comprising a water reservoir combined with a lower seat assembly having a deployed position, in which the lower seat assembly is in a deployed condition so as to support the motor vehicle occupant, a seatback assembly having a deployed position and a stowed position, wherein the seatback assembly may be pivoted between the deployed position, in which the seatback assembly is in an upright deployed condition so as to support a motor vehicle occupant, and the stowed position, in which the seatback assembly is pivoted forward to rest upon the lower seat assembly about a lower edge of the seatback assembly and, when the seatback assembly is in the deployed position, a volume is defined between a rear surface of the seatback assembly and a forward surface of a rear bulkhead of the motor vehicle. A water reservoir is installed behind the rear surface of the seatback assembly in the deployed position, wherein the water reservoir is removably received within the volume defined between the rear surface of the seatback assembly and the forward surface of a rear bulkhead of the motor vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
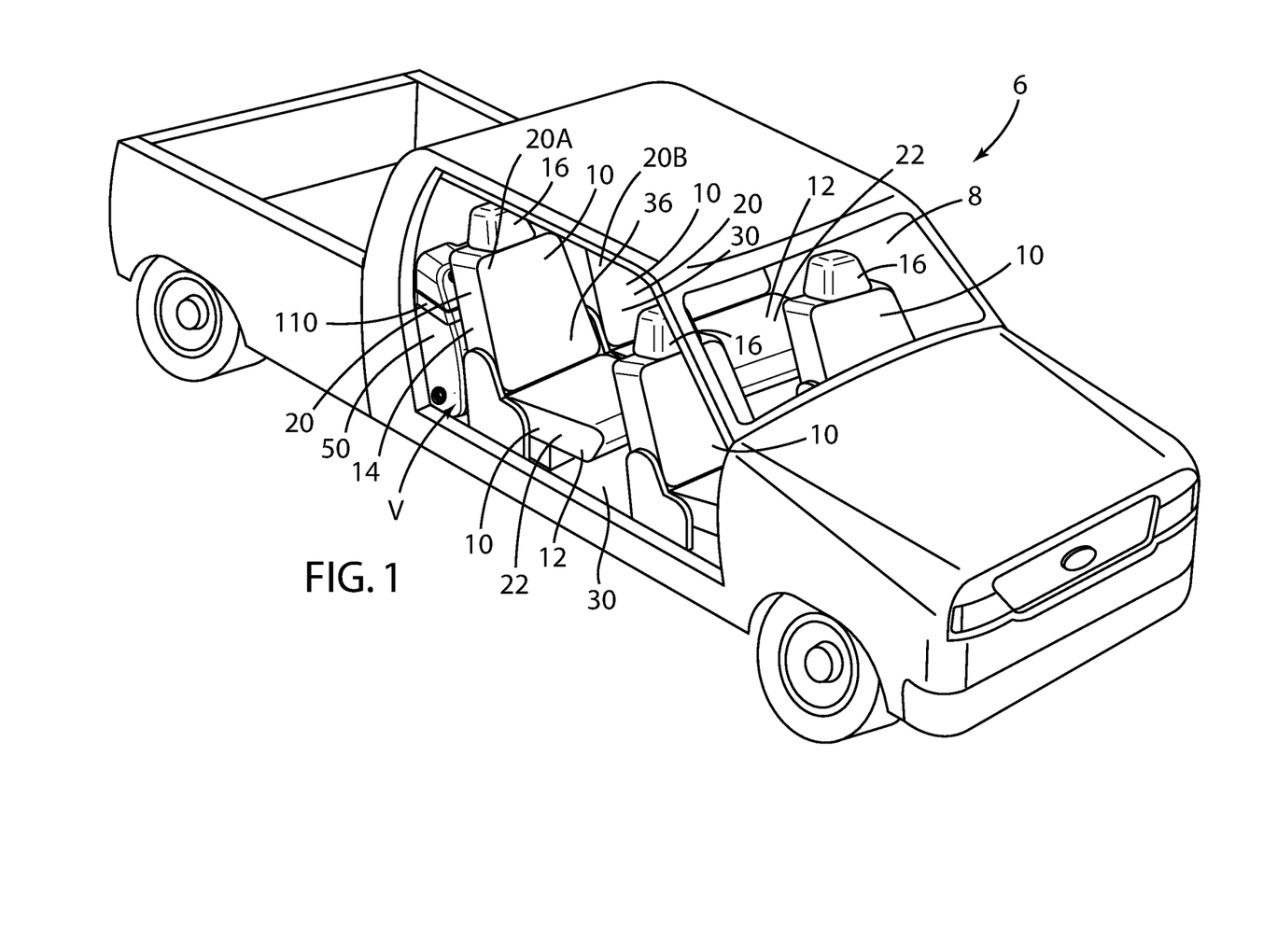
FIG. 1 is a front side perspective view of a motor vehicle seating assembly, wherein the lower seat assembly and seatback assembly of the motor vehicle seating assembly are in the deployed position, and a first embodiment of a water reservoir in accordance with the present disclosure is installed in the motor vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
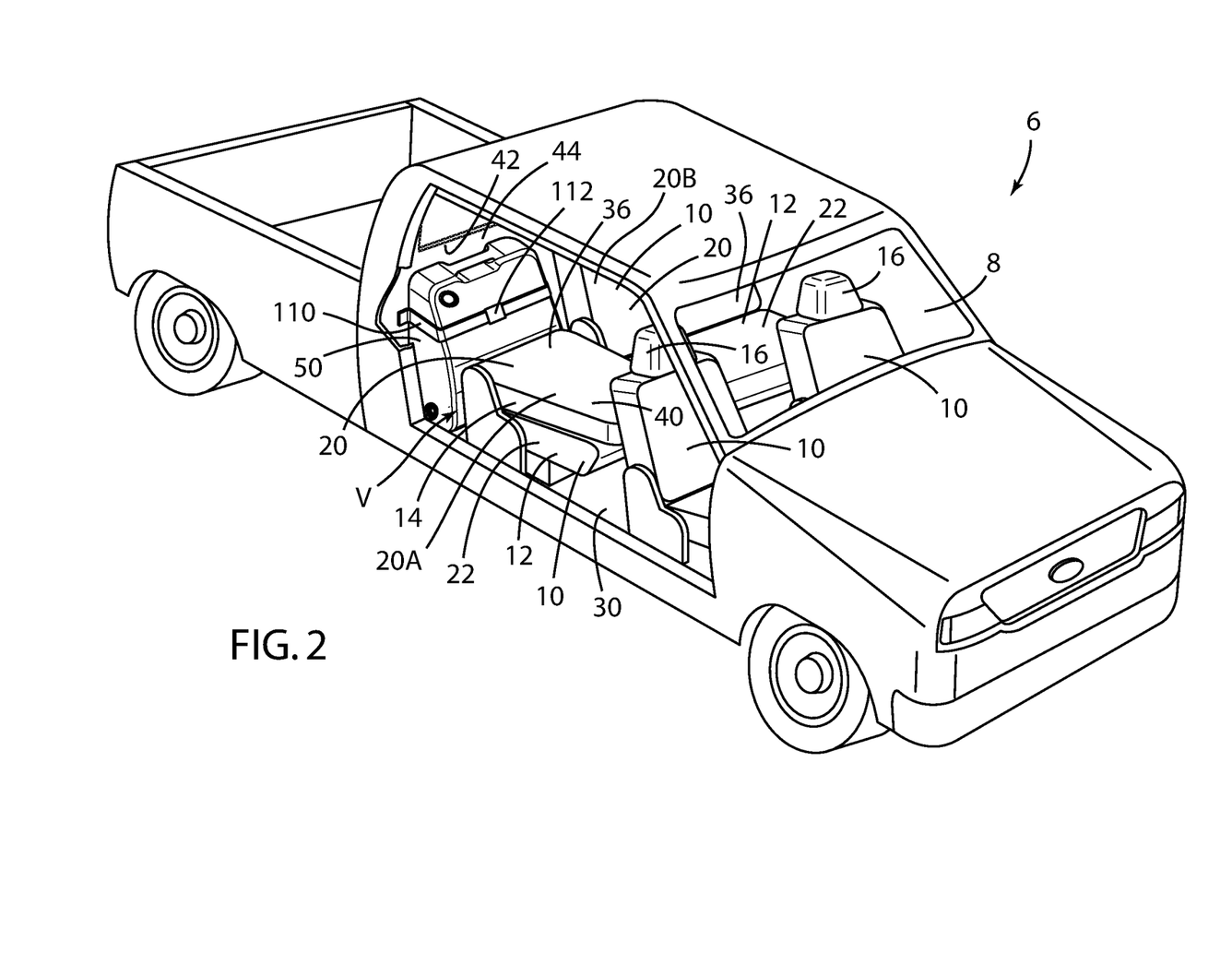
FIG. 2 is a front side perspective view of a motor vehicle seating assembly, wherein the lower seat assembly of the motor vehicle seating assembly is in the deployed position, the seatback assembly is in the stowed position, and the first embodiment of the water reservoir of FIG. 1 in accordance with the present disclosure is installed in the motor vehicle.

Referring to FIGS. 1 and 2, reference numeral 10 generally designates one or more motor vehicle seating assemblies for a motor vehicle 6 installed within an occupant compartment 8 of the motor vehicle 6. As is typical, the motor vehicle seating assembly 10 has a lower seat assembly 12 and an upwardly extending seatback assembly 14. The seatback assembly 14 preferably supports a headrest 16 thereon. In the case of the forward seating positions, the upwardly extending seatback assembly 14 may be pivotally coupled with the lower seat assembly 12, such that the upwardly extending seatback assembly 14 can be moved between upright and inclined positions relative to the lower seat assembly 12. The headrest 16 is operably, and preferably slidably, connected with the seatback assembly 14 and also positioned in a variety of positions and heights relative to the upwardly extending seatback assembly 14 to support the head and neck of a driver or a passenger.

In the case of the rear row motor vehicle seating assemblies 10, such as the second row motor vehicle seating assembly 20 shown in FIGS. 1, 2, 6, and 7, the configuration of the motor vehicle seating assembly 20 may employ the use of motor vehicle seating assemblies 10 provided with a flip upward or so-called "stadium style" lower seat assembly 12. This is particularly so as applied to rear seating positions in light and medium duty trucks. The "stadium style" lower seat assembly 12 includes a lower seat cushion 22 supported by a lower seat pan 24. The lower seat assembly 12 is pivotally mounted at a rear portion 26 thereof to a seat support bracket 28 and is pivotable between a lowered deployed position and a raised stowed position through a pivot P, as shown in FIGS. 1, 2, 6, and 7, respectively. The seat support bracket 28 is adapted for installation to a floor pan 30 of the motor vehicle 6.

As is typical in the design of the lower seat assembly 12, the lower seat assembly 12 comprises a lower seat cushion 22 and lower seat pan 24. The lower seat cushion 22 is preferably formed from a foamed polymer and the lower seat pan 24 is preferably configured from a substantially rigid material, such as aluminum, steel or rigid polyvinylchloride panel. The lower seat pan 24 may be attached at the pivot P of the seat support bracket 28 to support the lower seat assembly 12. A lower surface 32 of the lower seat pan 24 is preferably covered by or formed of a visually aesthetic material, such as cloth, carpeting, or textured plastic, owing to the fact that in the raised stowed position, the lower surface 32 of the lower seat pan 24 defines a design surface within the occupant compartment 8 of the motor vehicle 6.

The lower seat assembly 12 is thus pivotable between a deployed position and a stowed position, wherein the lower seat assembly 12 may be pivoted to the deployed position, in which the lower seat assembly 12 is in a deployed horizontal condition so as to support a motor vehicle occupant, and a stowed position, in which the lower seat assembly 12 is pivoted upwardly against the seatback assembly 14 about the rear portion 26 of the lower seat assembly 12. When the lower seat assembly 12 is in the deployed position, a volume V' is defined between the lower surface 32 of the lower seat assembly 12 and an upper surface 34 of the floor pan 30.

The seat support bracket 28 further may be provided with an upper pivot P' to which the upwardly extending seatback assembly 14 may be pivotably attached to the motor vehicle seating assembly 20 at a lower portion 36 thereof. In particular, the seatback assembly 14 comprises a pivotable cushion 38, also formed from a foam polymer, having a deployed position and a stowed position, wherein the seatback assembly 14 may be pivoted between the deployed position, in which the seatback assembly 14 is in an upright deployed condition so as to support a motor vehicle occupant, and a stowed position, in which the seatback assembly 14 is pivoted forward to rest upon the lower seat assembly 12 about a lower portion 36 of the seatback assembly 14. When the seatback assembly 14 is in the design or deployed position, a volume V is defined between a rear surface 40 of the seatback assembly 14 and a forward surface 42 of a rear bulkhead 44 of the occupant compartment 8 of the motor vehicle 6.

As is known, each of the lower seat assembly 12 and the seatback assembly 14 may be segregated into two separate sides 20A, 20B of the motor vehicle seating assemblies 20 in side by side juxtaposition one to the other and the volume V or V' may be defined in part by either of the seatback assembly 14 and the lower seat assembly 12, respectively, of a one of the two separate sides of the motor vehicle seating assemblies 20A, 20B. Preferably, the first side 20A of each of the lower seat assembly 12 and seatback assembly 14 comprises approximately 40% of the width of the motor vehicle seating assembly 20, and a second side 20B of each of the lower seat assembly 12 and seatback assembly 14 comprises approximately 60% of the width of the motor vehicle seating assembly 20.

Figures 3, 3A, 3B, 4:
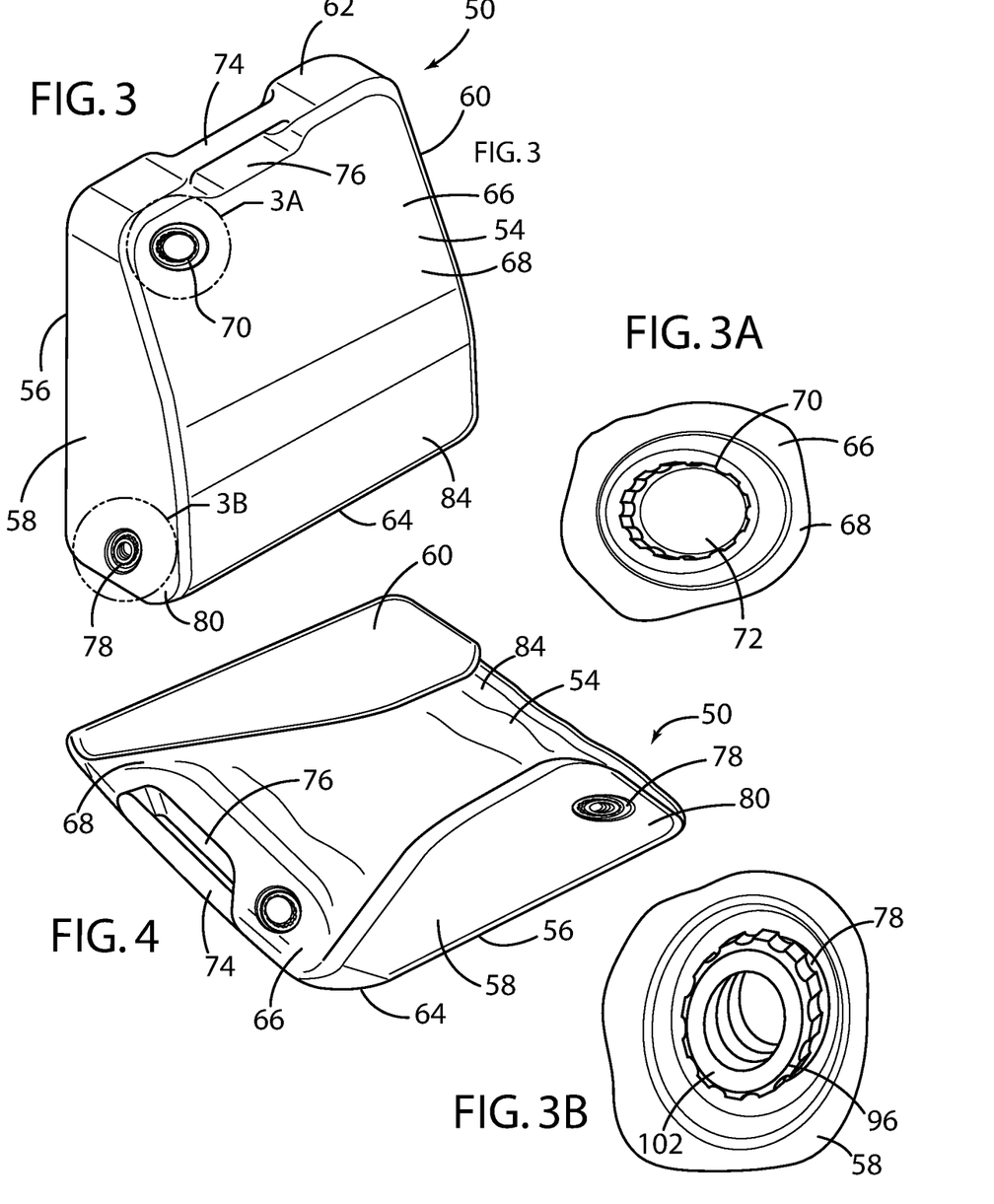
FIG. 3 is a front side perspective view of the first embodiment of the water reservoir of FIG. 1, wherein the water reservoir is removed from the motor vehicle.
FIG. 3A is an enlarged perspective view of the water inlet in the upper portion of the water reservoir of FIG. 3.
FIG. 3B is an enlarged perspective view of the opening in the lower portion of the water reservoir of FIG. 3.
FIG. 4 is a side perspective view of the first embodiment of the water reservoir of FIG. 1, wherein the water reservoir is removed from the motor vehicle and collapsed.
Figure 5:
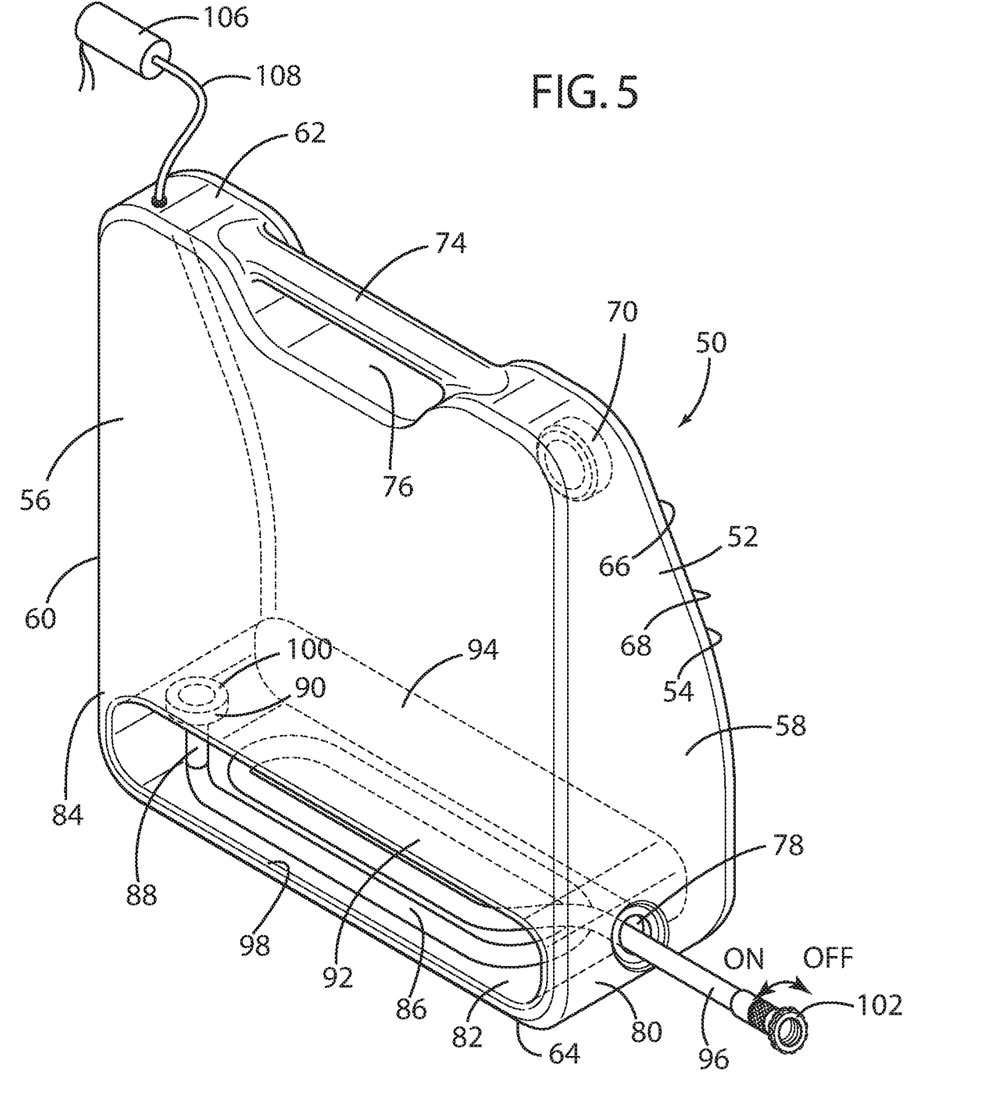
FIG. 5 is a rear side perspective view of the first embodiment of the water reservoir of FIG. 1, wherein the water reservoir is removed from the motor vehicle.

As shown in FIGS. 1-5, a first embodiment of the water reservoir 50 according to the present disclosure is shown, within which water may be stored in a primary chamber 52 thereof, as best shown in FIG. 5. This first embodiment of the water reservoir 50 comprises a substantially upright water reservoir generally shaped as a regular rectangular prism having a front face 54, a rear face 56, a pair of opposed side faces 58, 60, an upper face 62, and a lower face 64. An inwardly inclined surface 66 is formed on an upper portion 68 of the front face 54, as best seen in FIG. 3. Preferably, a water inlet 70 having a threaded removable cap 72 is formed on the upper portion 68, preferably in the inwardly inclined surface 66. The water inlet 70 is preferably recessed so as to create a smooth overall inwardly inclined surface 66.

A handle 74 is preferably integrally formed on the upper face 62 of the rectangular prism by which the water reservoir 50 may be manipulated and carried as discussed herein. Preferably, the upper face 62 of the water reservoir 50 comprises a depression 76 formed within the upper face 62 and the handle 74 is formed as a countersunk structure disposed within the depression 76. An opening 78 is preferably formed proximate a bottom portion 80 of one of the opposed side faces 58, 60, as shown in FIGS. 3 and 5. The water reservoir 50 is supported upon the lower face 64.

As best seen in FIG. 5, the water reservoir 50 is further provided with a storage chamber 82 on a lower portion 84 thereof within which is disposed a flexible retractable hose 86. A first end 88 of the retractable hose 86 is in fluid communication with a water outlet 90 disposed at a lower portion 92 of the primary chamber 52, preferably within a partition 94 between the storage chamber 82 and the primary chamber 52 of the water reservoir 50. A second end 96 of the retractable hose 86 extends through the opening 78 proximate the bottom of one of the opposed side faces 58, 60, whereby the retractable hose 86 may be either stored within the storage chamber 82 when not in use or extended through the opening 78 to allow the water in the water reservoir 50 to be dispensed at location away from the water reservoir 50, as further discussed below.

Figures 8, 9, 10:
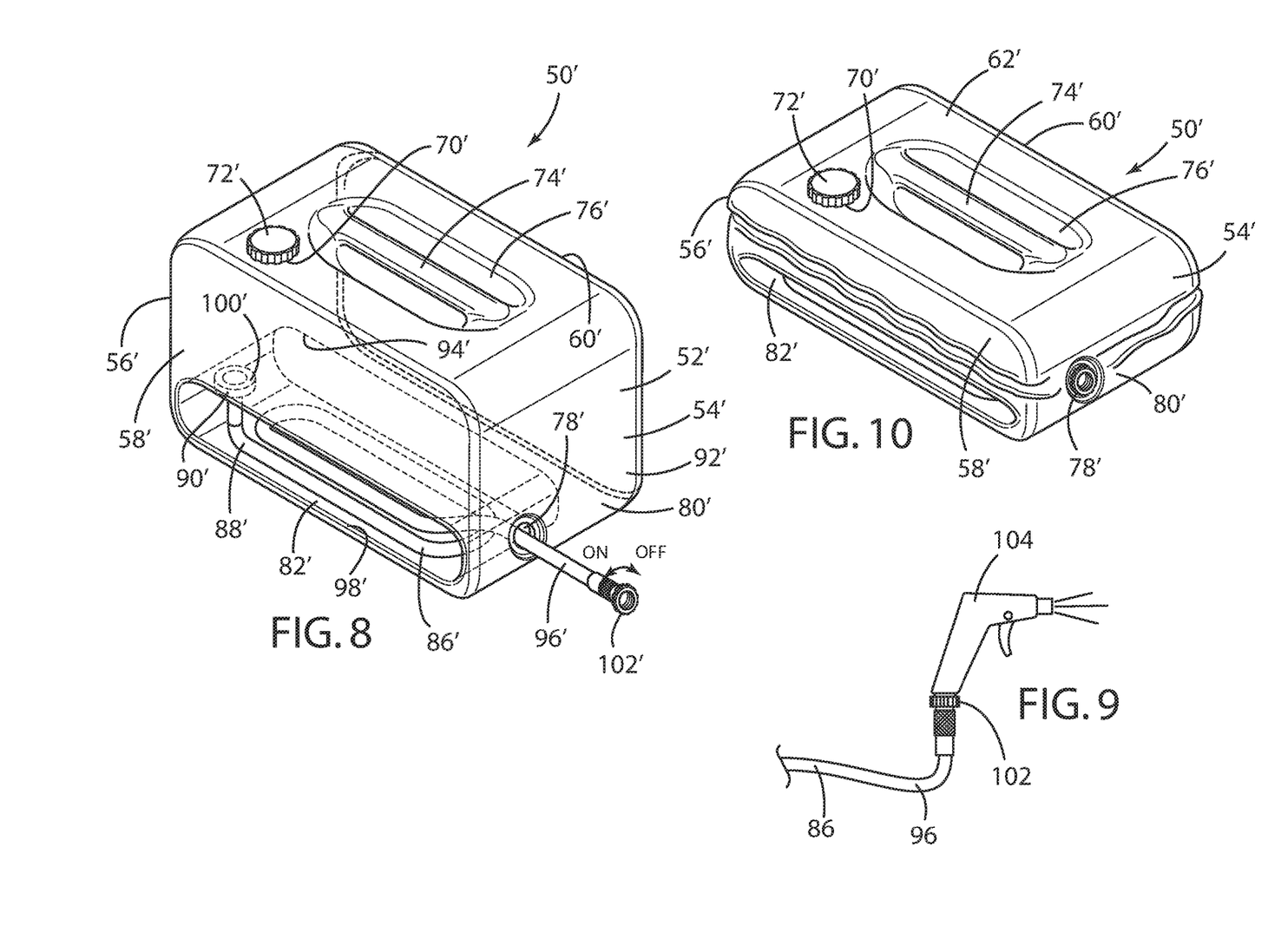
FIG. 8 is a front side perspective view of the second embodiment of the water reservoir of FIG. 6, wherein the water reservoir is removed from the motor vehicle.
FIG. 9 is a side view of a portion of the retractable hose and nozzle adapted for use with either of the first or second embodiments of the water reservoir in accordance with the present disclosure.
FIG. 10 is a front side perspective view of the second embodiment of the water reservoir of FIG. 1, wherein the water reservoir is removed from the motor vehicle and collapsed.

Preferably, an opening 98 is provided on the rear face 56 of the water reservoir 50 near the lower portion 84 to provide access to the storage chamber 82 and to allow attachment and detachment of the retractable hose 86 from the water outlet 90. To this end, the first end 88 of the retractable hose 86 is provided with a threaded coupling 100 by which it may be removably attached to a threaded nozzle (not shown) affixed to the partition 94 between the storage chamber 82 and the primary chamber 52 of the water reservoir 50. Similarly, the second end 96 of the retractable hose 86 may be provided with a threaded coupling 102 by which it may be removably attached to an adjustable manually actuated water nozzle 104, as shown in FIG. 9. Alternatively, the second end 96 of the retractable hose 86 may be provided with a simple petcock valve (not shown) to allow the user to dispense water from the water reservoir 50 at a distance away from the motor vehicle 6.

As disclosed, the water reservoir 50 is particularly adapted so that water contained within the water reservoir 50 may be evacuated from the water reservoir 50 via gravity alone. That is, in the disclosed configuration, where the water outlet 90 is disposed on the partition 94 between the primary chamber 52 and the storage chamber 82 and the retractable hose 86 is disposed below the water outlet 90, and when the cap 72 is loosened to allow air into the primary chamber 52, the pressure head created by the water itself will dispense the water to the water outlet 90 and the retractable hose 86 to the nozzle 104 or petcock valve. Alternatively, the air within the water reservoir 50 can be pressurized by an air pump 106 detachably coupled with and in fluid communication with the primary chamber 52 proximate the upper face 62 of the water reservoir 50 by a conduit 108, whereby water contained within the water reservoir 50 may be evacuated from the water reservoir 50 under the force of the air pressure contained within the primary chamber 52 of the water reservoir 50.

As shown in FIGS. 1 and 2, the first embodiment of the water reservoir is particularly adapted for storage within the volume V defined between the rear surface 40 of the seatback assembly 14 and the forward surface 42 of the rear bulkhead 44 of the occupant compartment 8 of the motor vehicle 6 situated behind the seatback assembly 14 when the seatback assembly 14 is in the deployed position, particularly in view of the inwardly inclined surface 66 formed on the upper portion 68 of the front face 54, as best seen in FIG. 3. With the seatback assembly 14 in the deployed position, as shown in FIG. 1, the water reservoir 50 is designed to substantially fill the volume V between the rear surface 40 of the seatback assembly 14 and the forward surface 42 of the rear bulkhead 44. With the seatback assembly 14 in the stowed position, as shown in FIG. 2, access to the water reservoir 50 is provided.

Preferably, the water reservoir 50 is attached and securely held in place by an adjustable nylon strap 110 that extends across the inwardly inclined surface 66 formed on the upper portion 68 of the front face 54 and each of the two opposed side faces 58, 60 and is attached proximate each of the two opposed side faces 58, 60 to the rear bulkhead 44 of the occupant compartment 8 of the motor vehicle 6. Further, a detachable buckle or clasp 112 is provided in the strap 110 to allow the strap 110 to be released from the water reservoir 50 and the water reservoir 50 to be removed from the motor vehicle 6. Alternatively, the strap 110 may be attached by hooks (not shown) on either end of the strap 110 to engage a pair of devises (not shown) mounted to the rear bulkhead 44 proximate each of the opposed side faces 58, 60 of the water reservoir 50.

When the seatback assembly 14 is in either of the deployed position or the stowed position, as shown in FIGS. 1 and 2, access to the water within the water reservoir 50 is provided by extending the retractable hose 86 through the opening 78 proximate the bottom portion 80 of one of the opposed side faces 58, 60, where the second end 96 of the retractable hose 86 is situated externally from and away from the motor vehicle 6. Particularly in the case where a nozzle 104 is provided, water within the water reservoir 50 may be selectively dispensed for any number of purposes, such as hosing off and cleaning boots, clothing, equipment, and even the motor vehicle 6 itself. When the water within the primary chamber 52 of the water reservoir 50 is depleted, the water reservoir 50 may be refilled via the water inlet 70. In this case, a hose providing a fresh supply of water may be brought to the water inlet 70 of the water reservoir 50. Alternatively, the strap 110 restraining the water reservoir 50 within the motor vehicle 6 can be released, and the water reservoir 50 can be removed from the motor vehicle 6 and brought to an external source of fresh water. In addition, the water reservoir 50 when full or partially full can be removed at any time from the motor vehicle 6 and put into service providing fresh water outside of the motor vehicle 6 in whatever application the user may find such use advantageous. In addition, the water reservoir 50 may be easily removed for easy cleaning.

Preferably, the water reservoir 50 is fabricated as a polymeric blow molded article of manufacture, and even more preferably fabricated from durable polyurethane to create a durable container. Preferably, by virtue of its manufacturer from polyurethane, the water reservoir 50 can be collapsed when empty, as shown in FIG. 4, to take up less space when not in use. Further, given the space available in this first embodiment, the water reservoir 50 preferably can hold several gallons of fresh water, and, in particular, preferably about five gallons of fresh water.

As shown in FIGS. 1 and 2, the water reservoir may be preferably shaped and sized to fit the volume V behind the first side 20A of each of the lower seat assembly 12 and seatback assembly 14 that comprise approximately 40% of the width of the motor vehicle seating assembly 20. It is, however, also contemplated that the water reservoir 50 may be shaped and sized to fit the volume V behind the second side 20B of each of the lower seat assembly 12 and seatback assembly 14 that comprise approximately 60% of the width of the motor vehicle seating assembly 20.

As seen in FIGS. 6 through 10, a second embodiment of the water reservoir 50' according to the present disclosure is shown, within which water may be stored in a primary chamber 52' thereof. In those instances relating to the second embodiment of the water reservoir 50', where the elements are the same or substantially the same as those of the first embodiment of the water reservoir 50, the same character reference numbers will be employed. This second embodiment of the water reservoir 50' may be also shaped as a regular rectangular prism having a front face 54', a rear face 56', a pair of opposed side faces 58', 60', an upper face 62', and a lower face 64', as best seen in FIGS. 8 and 10. Preferably, a water inlet 70' having a removably threaded cap 72' is formed on the upper face 62'. The water inlet 70' is also preferably recessed so as to create a smooth overall upper face 62'.

A handle 74' is preferably integrally formed on the upper face 62' of the rectangular prism. Preferably, the upper face 62' of the water reservoir 50' also comprises a depression 76' formed within the upper face 62' and the handle 74' is formed as a countersunk handle 74' disposed within the depression 76'. An opening 78' is likewise preferably formed proximate the bottom 80' of the front face 54', as shown in FIGS. 8 and 10. The water reservoir 50' is supported upon the lower face 64'.

As best seen in FIG. 8, the water reservoir 50' is also provided with a storage chamber 82' on lower portion 84' thereof within which is disposed a flexible retractable hose 86'. A first end 88' of the retractable hose 86' is in fluid communication with a water outlet 90' disposed at a lower portion 92' of the primary chamber 52', preferably in a partition 94' between the storage chamber 82' and the primary chamber 52' of the water reservoir 50'. A second end 96' of the retractable hose 86' extends through the opening 78' proximate the bottom 80' of the front face 54', whereby the retractable hose 86' may be either stored within the storage chamber 82' when not in use or extended through the opening 78' to allow the water in the water reservoir 50' to be dispensed at location away from the water reservoir 50'.

As in the first embodiment, the first end 88' of the retractable hose 86' is provided with a threaded coupling by which it may be removably attached to a threaded nozzle affixed to the water outlet 90' in the partition 94' between the storage chamber 82' and the primary chamber 52' of the water reservoir 50'. An opening 98' is likewise provided on the side face 58' of the water reservoir 50' near the lower portion 84' to provide access to the storage chamber 82' and to allow attachment and detachment of the retractable hose 86' from the water outlet 90'. The first end 88' of the retractable hose 86' may be similarly provided with a threaded coupling 100' by which it may be removably attached to a threaded nozzle (not shown) affixed to the partition 94' between the storage chamber 82' and the primary chamber 52' of the water reservoir 50'. Similarly, the second end 96' of the retractable hose 86' may be provided with a threaded coupling 102' by which it may be removably attached to an adjustable manually actuated water nozzle 104, as shown in FIG. 9. Alternatively, the second end 96' of the retractable hose 86' may be provided with a simple petcock valve (not shown) to allow the user to dispense water from the water reservoir 50' at a distance away from the motor vehicle 6.

The second embodiment of the water reservoir 50' is also particularly adapted to dispense water contained within the water reservoir 50' via gravity alone. Alternatively, the air within the water reservoir 50' can be pressurized by air pump 106, whereby water contained within the water reservoir 50' may be evacuated from the water reservoir 50' under the force of the air pressure contained within the primary chamber 52' of the water reservoir 50'.

Figure 6:
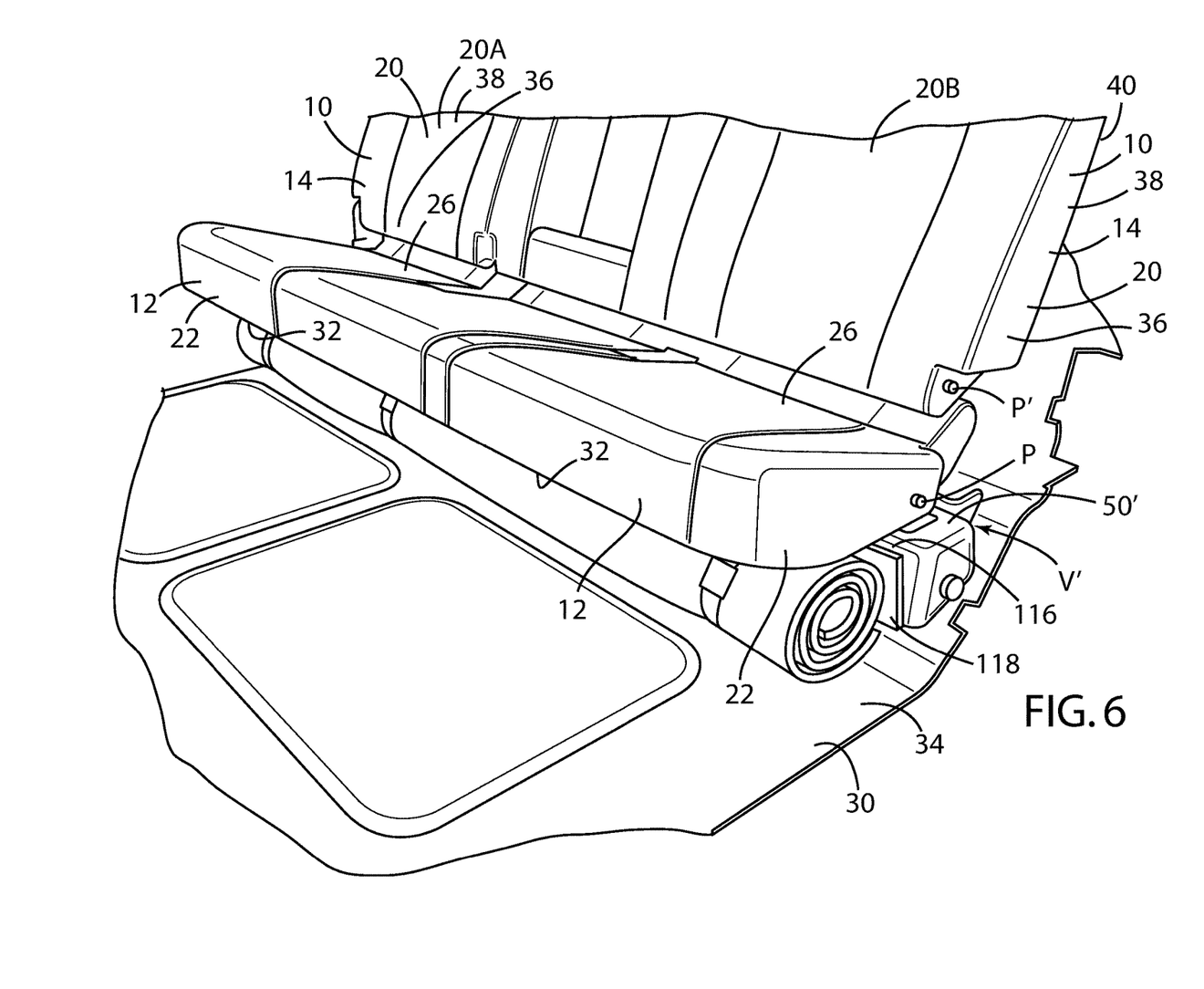
FIG. 6 is a front side perspective view of a motor vehicle seating assembly, wherein the lower seat assembly and the seatback assembly of the motor vehicle seating assembly are in the deployed position, and a second embodiment of a water reservoir in accordance with the present disclosure is installed in the motor vehicle.
Figure 7:
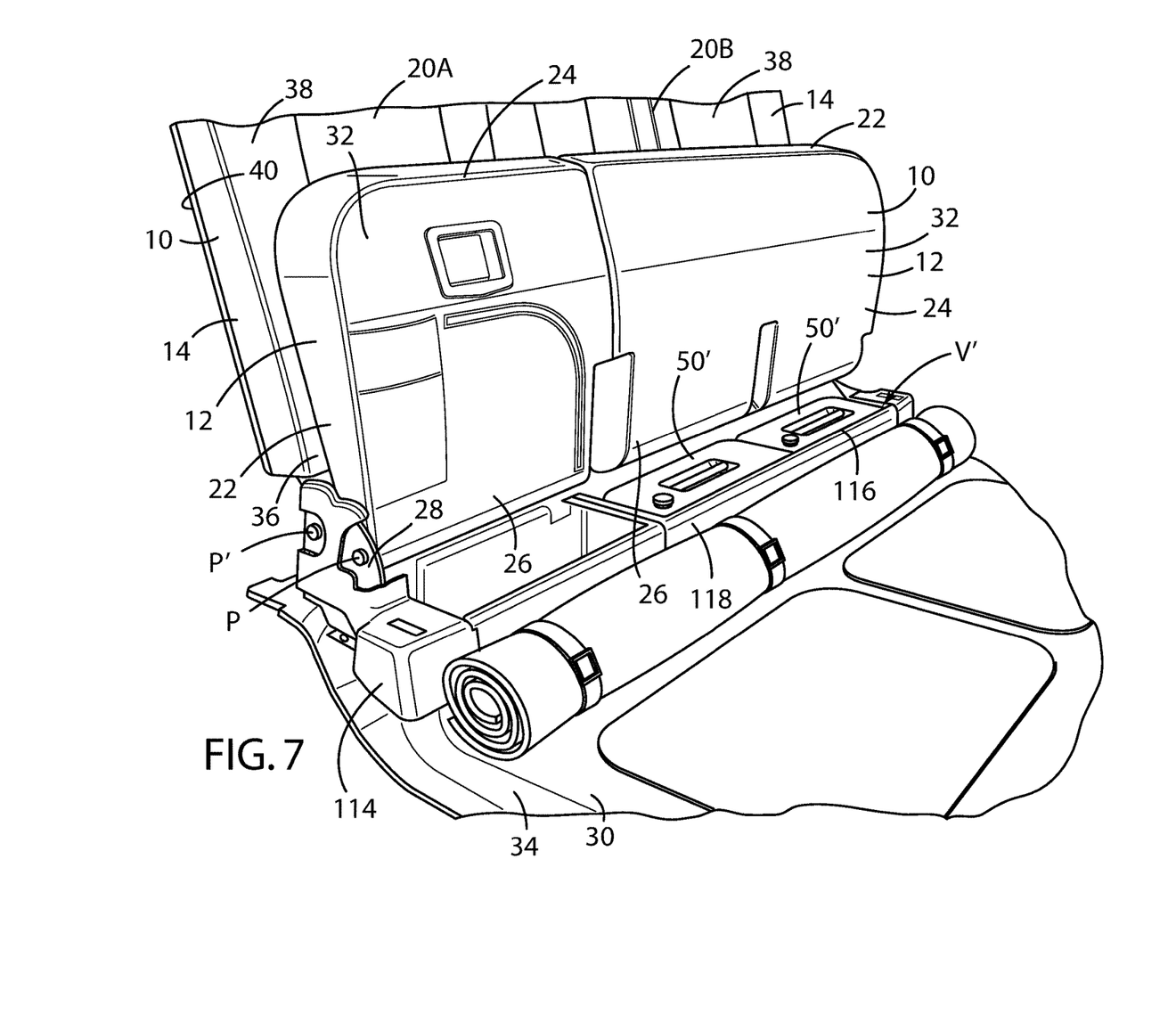
FIG. 7 is a front opposite side perspective view of a motor vehicle seating assembly, wherein the lower seat assembly of the motor vehicle seating assembly is in the stowed position, the seatback assembly is in the deployed position, and the second embodiment of the water reservoir of FIG. 6 in accordance with the present disclosure is installed in the motor vehicle.

As shown in FIGS. 6 and 7, the water reservoir 50' is particularly adapted for storage within the volume V' defined between the lower surface 32 of the lower seat assembly 12 and the upper surface 34 of the floor pan 30, where the water reservoir 50' is removably received within the volume V' defined between the lower surface 32 of the lower seat assembly 12 and the upper surface 34 of the floor pan 30. With the lower seat assembly 12 in the deployed position, as shown in FIG. 6, the water reservoir 50' is designed to substantially fill the volume V' between the lower surface 32 of the lower seat assembly 12 and the upper surface 34 of a floor pan 30. With the lower seat assembly 12 in the stowed position, as shown in FIG. 7, access to the water reservoir 50' is provided. Additionally, in order to improve the aesthetics of the configuration, a trim panel 114 that substantially hides the water reservoir 50' when installed may be removably attached to each outboard side of the motor vehicle seating assembly 20. In the preferred configuration shown in FIG. 6, which is shown with the trim panel 114 on the driver's side removed, full access to the water reservoir 50' may be obtained. Preferably, the water reservoir 50' is received and secured within an enclosure 116 created by risers 118 disposed below the lower seat assembly 12 and attached to the floor pan 30. The risers 118 are preferably configured to form the enclosure 116 that closely conforms to the exterior shape of the second embodiment of the water reservoir 50'.

When the lower seat assembly 12 in either of the deployed position or the stowed position, as shown in FIGS. 6 and 7, access to the water within the water reservoir 50' is likewise provided by extending the retractable hose 86' through the opening 78' proximate the bottom 80' of the front face 54'. When the water within the primary chamber 52' of the water reservoir 50' is depleted, the water reservoir 50' may be refilled via the water inlet 70'. In this case, a hose providing a fresh supply of water may be brought to the water inlet 70' of the water reservoir 50'. Alternatively, the water reservoir 50' can be simply lifted and removed from the motor vehicle 6 and brought to an external source of fresh water. In addition, the water reservoir 50' when full or partially full can be removed at any time from the motor vehicle 6 and put into service. In addition, the water reservoir 50' may be easily removed for easy cleaning.

Preferably, the water reservoir 50' of the second embodiment is likewise fabricated as a polymeric blow molded article of manufacture, and the more preferably with polyurethane, to create a durable container. Preferably, by virtue of its manufacturer from polyurethane, the water reservoir 50' can be collapsed when empty, as shown in FIG. 9. The water reservoir 50' of the second embodiment preferably can likewise hold several gallons of fresh water, and, in particular, preferably at least two gallons of fresh water.

As shown in FIG. 7, the water reservoir 50' of the second embodiment may be preferably shaped and sized to fit the volume V' below the second side of each of the lower seat assembly 12 and seatback assembly 14 that comprise approximately 60% of the width of the seating assembly. It is, however, also contemplated that the water reservoir 50' may be shaped and sized to fit the volume below the first side of each of the lower seat assembly 12 and seatback assembly 14 that comprise approximately 40% of the width of the seating assembly 10.

In the case where the second side 20B of each of the lower seat assembly 12 and seatback assembly 14 that comprise approximately 60% of the width of the motor vehicle seating assembly 20 is employed, given the additional lateral length available, preferably, a pair of water reservoirs 50' may be disposed in side by side juxtaposition one to the other within in an elongated enclosure 116 created by the risers 118 and within the volume V' defined in part by the lower seat assembly 12 and the floor pan 30, as shown in FIG. 7. As the outboard water reservoir 50' of the second embodiment is depleted, it can be simply removed and replaced by the inboard water reservoir 50.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A water reservoir system adapted for storage of a quantity of water within a volume of a motor vehicle comprising:
    a volume within the motor vehicle having a predetermined shape and size defined in part by either of a seatback assembly or a lower seat assembly of the motor vehicle in a deployed position, respectively; and
    a water reservoir adapted to contain the quantity of water, the water reservoir having an upper portion within which a primary chamber is disposed and a lower portion within which a storage chamber is disposed below the primary chamber and within which is disposed a flexible retractable hose having a first end directly coupled to and in fluid communication with a water outlet disposed at a lower portion of the primary chamber within a partition between the storage chamber and the primary chamber and a second end extending through an opening proximate the lower portion of the water reservoir, whereby the retractable hose may be either stored within the storage chamber when not in use or extended through the opening to allow the water in the water reservoir to be dispensed outside of the water reservoir, and wherein a second opening is provided on a face of the water reservoir near the lower portion of the water reservoir to provide access to the storage chamber and to allow attachment and detachment of the retractable hose from the water outlet;
    wherein the water reservoir has a predetermined shape and size to fit the predetermined shape and size of the volume and substantially fill the volume.

2. The water reservoir system of claim 1, wherein the water reservoir comprises blow molded polyurethane.

3. The water reservoir system of claim 1, wherein the water reservoir comprises a depression formed within the upper portion and a countersunk handle disposed within the depression.

4. The water reservoir system of claim 1, wherein the quantity of water is contained within the water reservoir and the quantity of water is evacuated from the water reservoir via gravity.

5. The water reservoir system of claim 1, wherein the quantity of water is contained within the water reservoir and the quantity of water is evacuated from the water reservoir via pressurization of the primary chamber of the water reservoir.

6. The water reservoir system of claim 1, wherein the water reservoir forms a collapsible container when empty.

7. The water reservoir system of claim 1, wherein each of the lower seat assembly and the seatback assembly are segregated into two separate seating assemblies in side-by-side juxtaposition one to the other and the volume is defined in part by either of the seatback assembly or the lower seat assembly, respectively, of a one of the two separate seating assemblies.

8. The water reservoir system of claim 7, wherein a first side of each of the lower seat assembly and seatback assembly comprises approximately 40% of the width of the seating assembly and a second side of each of the lower seat assembly and seatback assembly comprises approximately 60% of the width of the seating assembly.

9. The water reservoir system of claim 7, further comprising a pair of the water reservoirs in side-by-side juxtaposition one to the other, the pair of water reservoirs being disposed within and in combination substantially filling the volume defined in part by one of the seatback assembly or the lower seat assembly, respectively, of a one of the two separate seating assemblies.

10. The water reservoir system of claim 1, wherein the lower seat assembly comprises a flip upward lower seat assembly having the deployed position and a stowed position, wherein the lower seat assembly may be pivoted between the deployed position, in which the lower seat assembly is in a deployed horizontal condition so as to support a motor vehicle occupant, and the stowed position, in which the lower seat assembly is pivoted upwardly against the seatback assembly about a rear portion of the lower seat assembly and, when the lower seat assembly is in the deployed position, the volume is further defined between a lower surface of the lower seat assembly and an upper surface of a floor pan, and the water reservoir is removably received within the volume defined between the lower surface of the lower seat assembly and the upper surface of the floor pan.

11. The water reservoir system of claim 10, wherein each of the lower seat assembly and the seatback assembly is segregated into two separate seating assemblies in side-by-side juxtaposition one to the other and the volume is defined in part by either of the seatback assembly or the lower seat assembly, respectively, of a one of the two separate seating assemblies, and a first side of each of the lower seat assembly and seatback assembly comprises approximately 40% of the width of the seating assembly and a second side of each of the lower seat assembly and seatback assembly comprises approximately 60% of the width of the seating assembly, and the water reservoir is disposed below the second side of the lower seat assembly.

12. The water reservoir system of claim 10, wherein the volume is further defined by an enclosure created by risers disposed below the lower seat assembly.

13. The water reservoir system of claim 12, wherein the quantity of water is stored within the primary chamber, the primary chamber further comprising a water inlet disposed within an upper portion thereof, and the seating assembly further comprises an outboard side having a removable trim cover by which the flexible retractable hose in fluid communication with the water outlet of the primary chamber may be extended externally from the motor vehicle.

14. The water reservoir system of claim 13, further comprising a pair of water reservoirs in side-by-side juxtaposition one to the other and the risers receive the pair of water reservoirs in side-by-side juxtaposition one to the other.

15. The water reservoir system of claim 1, wherein the seatback assembly comprises a pivotable cushion having the deployed position and a stowed position, wherein the seatback may be pivoted between the deployed position, in which the seatback assembly is in an upright deployed condition so as to support a motor vehicle occupant, and the stowed position, in which the seatback assembly is pivoted forward to rest upon the lower seat assembly about a lower edge of the seatback assembly and, when the seatback assembly is in the deployed position, the volume is further defined between a rear surface of the seatback assembly and a forward surface of a rear bulkhead of the motor vehicle, and the water reservoir is removably received within the volume defined between the rear surface of the seatback assembly and the forward surface of the rear bulkhead of the motor vehicle.

16. The water reservoir system of claim 15, further comprising a retaining strap removably affixing the water reservoir against the forward surface of the rear bulkhead of the motor vehicle.

17. The water reservoir system of claim 15, wherein each of the lower seat assembly and the seatback assembly are segregated into two separate seating assemblies in side-by-side juxtaposition one to the other and the volume is defined in part by the seatback assembly of a one of the two separate seating assemblies, a first side of each of the lower seat assembly and seatback assembly comprises approximately 40% of the width of the seating assembly, and a second side of each of the lower seat assembly and seatback assembly comprises approximately 60% of the width of the seating assembly, and wherein the water reservoir is disposed behind the first side of the seatback assembly.

18. A water reservoir system in combination with a second row seating position motor vehicle seating assembly comprising:
a seatback assembly having a deployed position;
a flip upward lower seat assembly having a deployed position and a stowed position, wherein the lower seat assembly may be pivoted between the deployed position, in which the lower seat assembly is in a deployed horizontal condition so as to support a motor vehicle occupant, and the stowed position, in which the lower seat assembly is pivoted upwardly against the seatback assembly about a rear portion of the lower seat assembly and, when the lower seat assembly is in the deployed position, a volume is defined between a lower surface of the lower seat assembly and an upper surface of a floor pan, the volume having a predetermined shape and size defined in part by the lower seat assembly in the deployed position, respectively; and
a water reservoir adapted for storage of a quantity of water and having a predetermined shape and size to fit the predetermined shape and size of the volume and substantially fill the volume;
wherein the water reservoir is installed below the lower seat assembly in the deployed position, the water reservoir is removably received within the volume defined between the lower surface of the lower seat assembly and the upper surface of the floor pan, and the water reservoir comprises a storage chamber disposed below a primary chamber on a lower portion of the water reservoir within which is disposed a flexible retractable hose having a first end directly coupled to and in fluid communication with a water outlet disposed at a lower portion of the primary chamber within a partition between the storage chamber and the primary chamber and a second end extending through an opening proximate the lower portion of the water reservoir, whereby the retractable hose may be either stored within the storage chamber when not in use or extended through the opening to allow the quantity of water in the water reservoir to be dispensed outside of the water reservoir; and wherein a second opening is provided on a face of the water reservoir near the lower portion of the water reservoir to provide access to the storage chamber and to allow attachment and detachment of the retractable hose from the water outlet.

19. A water reservoir system in combination with a motor vehicle seating assembly comprising:
a lower seat assembly having a deployed position, in which the lower seat assembly is in a deployed condition so as to support the motor vehicle occupant; and
a seatback assembly having a deployed position and a stowed position, wherein the seatback assembly may be pivoted between the deployed position, in which the seatback assembly is in an upright deployed condition so as to support a motor vehicle occupant, and the stowed position, in which the seatback assembly is pivoted forward to rest upon the lower seat assembly about a lower edge of the seatback assembly and, when the seatback assembly is in the deployed position, a volume is defined between a rear surface of the seatback assembly and a forward surface of a rear bulkhead of the motor vehicle, the volume having a predetermined shape and size defined in part by the seatback assembly in the deployed position; and a water reservoir adapted for storage of a quantity of water and having a predetermined shape and size to fit the predetermined shape and size of the volume and substantially fill the volume;

wherein the water reservoir is installed behind the rear surface seatback in the deployed position, the water reservoir is removably received within the volume defined between the rear surface of the seatback assembly and the forward surface of the rear bulkhead of the motor vehicle, and the water reservoir comprises a storage chamber disposed below a primary chamber on a lower portion of the water reservoir within which is disposed a flexible retractable hose having a first end directly coupled to and in fluid communication with a water outlet disposed at a lower portion of the primary chamber within a partition between the storage chamber and the primary chamber and a second end extending through an opening proximate the lower portion of the water reservoir, whereby the retractable hose may be either stored within the storage chamber when not in use or extended through the opening to allow the quantity of water in the water reservoir to be dispensed outside of the water reservoir; and wherein a second opening is provided on a face of the water reservoir near the lower portion of the water reservoir to provide access to the storage chamber and to allow attachment and detachment of the retractable hose from the water outlet.

* * * * *